(12) United States Patent
Kunimi et al.

(10) Patent No.: US 9,846,176 B2
(45) Date of Patent: Dec. 19, 2017

(54) ACCELERATION SENSOR CIRCUIT

(71) Applicants: AKEBONO BRAKE INDUSTRY CO., LTD., Chuo-ku, Tokyo (JP); JAPAN OIL, GAS AND METALS NATIONAL CORPORATION, Tokyo (JP)

(72) Inventors: Takashi Kunimi, Tokyo (JP); Toru Sekine, Tokyo (JP)

(73) Assignees: AKEBONO BRAKE INDUSTRY CO., LTD., Tokyo (JP); Japan Oil, Gas and Metals National Corporation, Tokyo (JP)

( * ) Notice: Subject to any disclaimer, the term of this patent is extended or adjusted under 35 U.S.C. 154(b) by 251 days.

(21) Appl. No.: 14/348,075

(22) PCT Filed: Sep. 28, 2012

(86) PCT No.: PCT/JP2012/075157
§ 371 (c)(1),
(2) Date: Mar. 28, 2014

(87) PCT Pub. No.: WO2013/047787
PCT Pub. Date: Apr. 4, 2013

(65) Prior Publication Data
US 2014/0230551 A1    Aug. 21, 2014

(30) Foreign Application Priority Data
Sep. 30, 2011    (JP) .................. 2011-216051

(51) Int. Cl.
*G01P 15/125* (2006.01)
*G01P 15/08* (2006.01)

(52) U.S. Cl.
CPC ........ *G01P 15/125* (2013.01); *G01P 15/0802* (2013.01)

(58) Field of Classification Search
CPC .................... G01P 15/125; G01P 15/0802
(Continued)

(56) References Cited

U.S. PATENT DOCUMENTS 5,043,610 A * 8/1991 Craddock .............. H03H 11/24
327/307
5,345,824 A * 9/1994 Sherman ............... B81C 99/004
73/514.18
(Continued)

FOREIGN PATENT DOCUMENTS

| EP | 0716308 A2 | 6/1996 |
| JP | H07-128362 A | 5/1995 |

(Continued)

OTHER PUBLICATIONS

Extended European Search Report dated Jan. 27, 2015 from corresponding European Application No. 12835369.5 (6 pages).
(Continued)

*Primary Examiner* — Lisa Caputo
*Assistant Examiner* — Tarun Sinha
(74) *Attorney, Agent, or Firm* — Drinker Biddle & Reath LLP (57) ABSTRACT

An acceleration sensor circuit 1 of the invention includes an acceleration sensor 11 having a first capacitor C1 whose capacitance changes according to a position of a first movable electrode and a second capacitor C2 whose capacitance changes as opposed to the first capacitor according to a position of a second movable electrode moved together with the first movable electrode, a first circuit 15A for generating a sinusoidal AC signal of a predetermined frequency, a second circuit 12 for generating a signal according to the positions of the movable electrodes, and an arithmetic
(Continued)

circuit 14 for analyzing data in which a signal generated by the second circuit 12 is encoded and outputting data of acceleration.

3 Claims, 7 Drawing Sheets (58) Field of Classification Search
USPC .................................................. 73/514.32
See application file for complete search history.

(56) References Cited

U.S. PATENT DOCUMENTS

| | | | |
|---|---|---|---|
| 5,465,604 A | 11/1995 | Sherman | |
| 5,540,095 A | 7/1996 | Sherman et al. | |
| 5,597,956 A * | 1/1997 | Ito | G01P 15/125 73/514.18 |
| 6,153,917 A | 11/2000 | Matsunaga et al. | |
| 6,188,340 B1 | 2/2001 | Matsumoto et al. | |
| 6,487,787 B1 * | 12/2002 | Nahum | G01D 18/008 33/702 |
| 2003/0024298 A1 * | 2/2003 | Baber | G01D 3/08 73/1.82 |
| 2007/0220974 A1 * | 9/2007 | Wada | G01P 15/125 73/514.32 |
| 2011/0100126 A1 | 5/2011 | Jeong et al. | |
| 2011/0132089 A1 | 6/2011 | Jeong et al. | |
| 2012/0105054 A1 * | 5/2012 | Connolly | G01P 21/00 324/162 |

FOREIGN PATENT DOCUMENTS

| | | |
|---|---|---|
| JP | H08-62248 A | 3/1996 |
| JP | A-H08-178954 | 7/1996 |
| JP | H08-178953 A | 7/1996 |
| JP | H11-118552 A | 4/1999 |
| JP | H11-258092 A | 9/1999 |
| JP | H11-258265 A | 9/1999 |
| JP | 2010-169534 A | 8/2010 |
| JP | A-2011-017628 | 1/2011 |
| JP | 2011-033602 A | 2/2011 |
| JP | A-2011-059015 | 3/2011 |
| JP | A-2011-064515 | 3/2011 |
| JP | A-2011-095104 | 5/2011 |
| WO | WO 2010-026843 | 3/2010 |

OTHER PUBLICATIONS

A Japanese Office Action (with English-language translation) dated Jun. 9, 2015 that issued in Japanese patent application No. 2011-216051.

European Office Action dated Dec. 1, 2015 from corresponding European Application No. 12835369.5 (4 pages).

Final Rejection with English Language Translation dated Jan. 4, 2016, issued in corresponding Japanese Patent Application No. 2011-216051 (6 pages).

Reconsideration Report (along with its English-language translation) dated May 20, 2016 in corresponding Japanese Patent Application No. 2011-216051.

Shigeo Minami, "Detection and Extraction of Signal Waveforms", Japan, CQ Publishing Co., Ltd., Jan. 20, 1992, 9th Edition, p. 111-115.

Notification of Reasons for Refusal (along with its English-language translation) dated Oct. 17, 2016 in corresponding Japanese Patent Application No. 2011-216051.

* cited by examiner

ACCELERATION SENSOR CIRCUIT

TECHNICAL FIELD

The present invention relates to an acceleration sensor circuit for detecting acceleration by a change in capacitance.

BACKGROUND ART

An acceleration sensor is used in a wide field of automotive airbags, game machines, etc. The acceleration sensor used in the field is small in size, and has frequency characteristics ranging from the vicinity of 0 to several thousand Hz (low frequency band) and has a high sensitivity.

Incidentally, a reflection seismic prospecting method which is a kind of geophysical prospecting is a method for artificially generating seismic waves and capturing reflected waves bounced back from the underground by a geophone installed on the surface of the ground and analyzing its result and solving an underground structure. This geophone includes an acceleration sensor, and vibration induced by the reflected waves is detected as acceleration. In the reflection seismic prospecting method, about 1000 geophones are installed to detect the underground structure. In the future, it will be assumed that about 1000000 geophones are installed at an about 10-m grid spacing.

CITATION LIST

Patent Reference

Patent Reference 1: JP-A-11-258265
Patent Reference 2: JP-A-2010-169534

SUMMARY OF INVENTION

Technical Problem

The acceleration sensor used in the field of the reflection seismic prospecting method etc. requires acceleration detection of about 120 dB as a dynamic range. However, for example, an acceleration sensor for vehicle control only performs acceleration detection of about 60 to 80 dB as a dynamic range, and desires to more improve performance, that is, improve detection sensitivity. On the other hand, it is contemplated to improve the detection sensitivity by making full use of high-performance amplifier circuits or filter circuits, but it is necessary to install many sensors in the field of, for example, the reflection seismic prospecting method, with the result that a lower-cost and high-performance acceleration sensor is required.

The invention has been implemented in view of the point described above, and an object of the invention is to provide a low-cost and high-performance acceleration sensor circuit.

Solution to Problem

In order to solve the problem described above, the invention applies a sinusoidal AC signal of a predetermined frequency to a capacitor of an acceleration sensor, and extracts a signal of a component of the same frequency as the predetermined frequency from a signal of the acceleration sensor by an arithmetic circuit.

Specifically, an acceleration sensor circuit according to the invention includes an acceleration sensor including a first capacitor whose capacitance changes according to a position of a first movable electrode, and a second capacitor whose capacitance changes as opposed to the first capacitor according to a position of a second movable electrode moved together with the first movable electrode; a first circuit for generating a sinusoidal AC signal of a predetermined frequency for being applied to the first capacitor and the second capacitor in mutually opposite phases; a second circuit for generating a signal according to the positions of the movable electrodes based on a difference between a capacitance of the first capacitor and a capacitance of the second capacitor and the sinusoidal AC signal applied to the first capacitor and the second capacitor; and an arithmetic circuit for analyzing data in which a signal generated by the second circuit is encoded and extracting a signal of a frequency component of substantially the same frequency as the predetermined frequency from the data and outputting data of acceleration based on the extracted signal.

According to the acceleration sensor circuit described above, detection sensitivity of acceleration can be increased by detecting acceleration from a time change in difference (C1–C2) between capacitances. Also, the sinusoidal AC signal of the predetermined frequency is applied to each of the capacitors of the acceleration sensor, and a signal according to acceleration is generated by using this signal. Accordingly, a signal of an unnecessary frequency other than the predetermined frequency included in a generated acceleration signal as a result of increasing the detection sensitivity can be eliminated by the arithmetic circuit to easily extract only a desired signal.

As a result, the high-performance acceleration sensor circuit can be implemented at low cost without using high-performance amplifier circuits or analog filter circuits.

In addition, the first circuit may include a DA converter for generating the sinusoidal AC signal of an analog based on a digital signal obtained by converting a sinusoidal wave of the predetermined frequency generated by the arithmetic circuit. In the case of analyzing a signal generated by the second circuit and extracting a desired wave when a sinusoidal signal of the predetermined frequency is derived and generated from the arithmetic circuit, timing of arithmetic processing of the arithmetic circuit matches with timing of an AC signal outputted by the DA converter, and the signal can be processed properly.

Also, the first circuit may include a non-inverting amplifier for applying a sinusoidal AC signal with the same phase as that of a signal generated by the DA converter to the first capacitor, and an inverting amplifier for applying a sinusoidal AC signal with a phase opposite to that of a signal generated by the DA converter to the second capacitor. By configuring the first circuit in this manner, timing of a signal applied to the first capacitor of the acceleration sensor matches with timing of a signal applied to the second capacitor, and acceleration can be detected properly.

Also, the arithmetic circuit may add a predetermined voltage to the sinusoidal AC signal outputted from the non-inverting amplifier and applied to the first capacitor, and to the sinusoidal AC signal outputted from the inverting amplifier and applied to the second capacitor, and make an offset adjustment. Since the arithmetic circuit analyzes a signal generated by the second circuit and performs various processing as a premise, when the arithmetic circuit offsets the sinusoidal AC signal applied to each of the capacitors of the acceleration sensor, the signal generated by the second circuit can be analyzed to easily decide and adjust an offset amount.

Advantageous Effects of Invention

According to the invention, a high-performance acceleration sensor circuit can be implemented at low cost.

BRIEF DESCRIPTION OF DRAWINGS

FIGS. 2A to 2C are operation explanatory diagrams of an acceleration sensor, and FIG. 2A is the case of having no acceleration, and FIG. 2B is the case of having downward acceleration, and FIG. 2C is the case of having upward acceleration.

DESCRIPTION OF EMBODIMENTS

An embodiment of the invention of the present application will hereinafter be described. The embodiment shown below illustratively shows one aspect of the invention of the present application, and the technical scope of the invention of the present application is not limited to the following embodiment.
<Embodiment>

Figure 1:
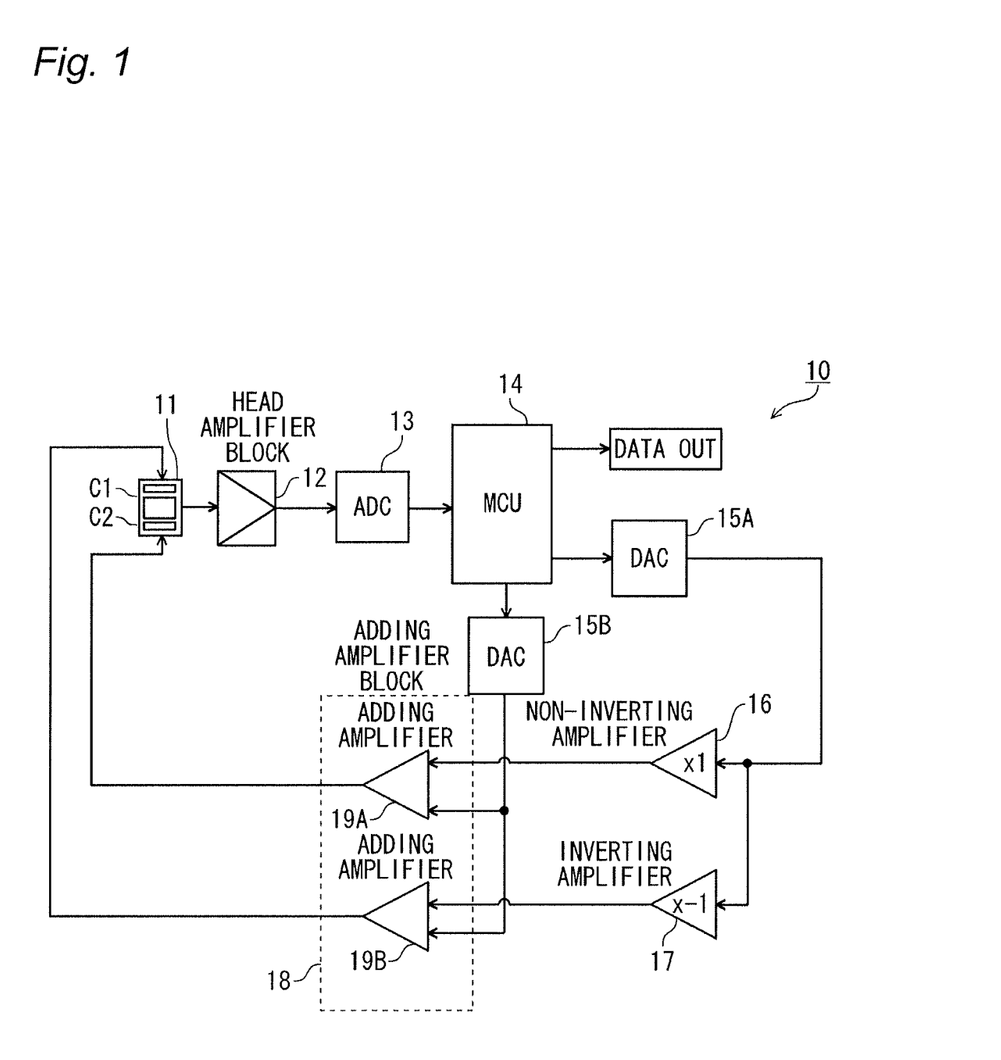
FIG. 1 is a diagram showing an acceleration sensor circuit according to an embodiment.

FIG. 1 shows an acceleration sensor circuit according to an embodiment. An acceleration sensor circuit 10 includes an acceleration sensor 11 for detecting acceleration, a head amplifier block 12, an AD (Analog to Digital) converter 13, an MCU (Micro-controller unit) 14, DA (Digital to Analog) converters 15A, 15B, a non-inverting amplifier 16, an inverting amplifier 17, and an adding amplifier block 18.

The MCU 14 is an electronic component in which computer systems such as an arithmetic element, a memory or an input-output interface are incorporated into one integrated circuit, and executes a computer program stored in a non-volatile memory to execute various arithmetic processing. The MCU 14 filters a digital signal inputted from the AD converter 13 by a BPF (Band-pass filter) using Fourier transformation, and outputs digital data to the DA converters 15A, 15B.

Figure 2A:
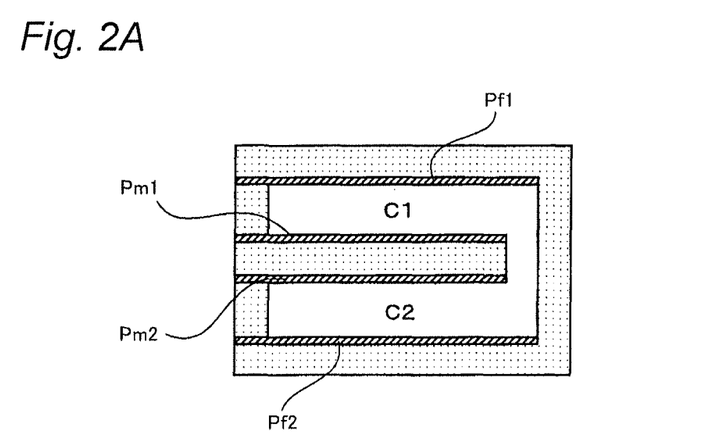
Figure 2B:
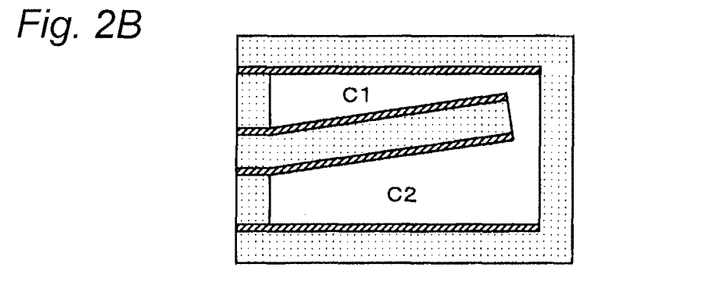
Figure 2C:
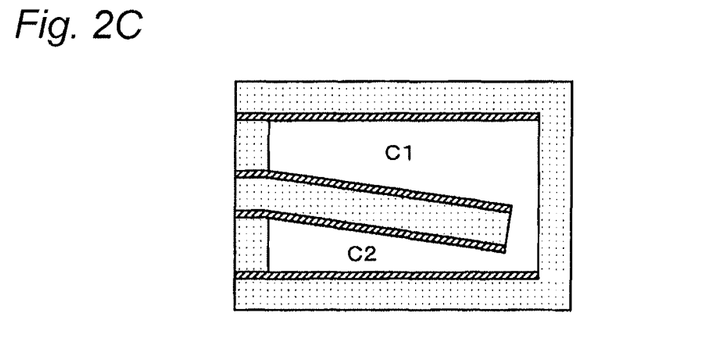

FIGS. 2A to 2C show operation of the acceleration sensor. The acceleration sensor 11 is a sensor of MEMS (Micro Electro Mechanical System), and is an acceleration sensor of a capacitance type including capacitors (capacitors) C1, C2. This acceleration sensor 11 includes combination of two minute fixed electrodes Pf1, Pf2 and two movable electrodes Pm1, Pm2. When acceleration is caused, a cantilever is bent and the movable electrodes Pm1, Pm2 are moved to change capacitances between the movable electrodes Pm1, Pm2 and each of the fixed electrodes Pf1, Pf2. That is, in this acceleration sensor 11, the movable electrodes Pm1, Pm2 are inserted and placed in the two facing fixed electrodes Pf1, Pf2 and thereby, when acceleration is caused to the acceleration sensor 11 and the movable electrodes Pm1, Pm2 are moved. For example, the movable electrodes Pm1, Pm2 are moved nearer to the fixed electrode Pf1 of the side of the capacitor C1 as shown in FIG. 2B, the capacitance of the capacitor C1 increases and the capacitance of the capacitor C2 decreases. Also, for example, when the movable electrodes Pm1, Pm2 are moved nearer to the fixed electrode Pf2 of the side of the capacitor C2 as shown in FIG. 2C, the capacitance of the capacitor C1 decreases and the capacitance of the capacitor C2 increases. Also, in a state in which acceleration is not caused, both capacitances of the capacitor C1 and the capacitor C2 become equal as shown in FIG. 2A. Hereinafter, the capacitance of the capacitor C1 and the capacitance of the capacitor C2 may be described as C1 and C2, respectively, by numerals in which variables representing the capacitances are assigned to the capacitors.

The head amplifier block 12 is a CV (Capacitance Voltage) conversion circuit for fetching a change in difference between the capacitances of the capacitors C1, C2 of the acceleration sensor 11 as an electrical signal and outputting the electrical signal as a voltage proportional to the difference between the capacitances.

The AD converter 13 is a conversion circuit for converting an analog signal into a digital signal. Methods of AD conversion include a flash type, a pipeline type, a successive comparison type, a delta sigma type, a double integral type, etc., and in the present embodiment used in various acceleration measurements, for example, the delta sigma type suitable for sound processing or various measurements is suitable. A sampling frequency of the AD converter 13 is set at a frequency sufficiently higher than an objective sampling frequency, and the analog signal can be sampled properly.

The DA converters 15A, 15B are conversion circuits for converting a digital signal into an analog signal. Methods of DA conversion include a resistance ladder type, a resistance string type, a current output type, a delta sigma type, etc., and in the present embodiment used in various acceleration measurements, for example, the delta sigma type suitable for sound processing or various measurements is suitable. Sampling frequencies of the DA converters 15A, 15B are set at sufficiently high frequencies, and a high-accuracy analog signal can be generated properly.

The adding amplifier block 18 is a circuit including adding amplifiers 19A, 19B. The adding amplifier block 18 adds offset voltages outputted from the DA converter 15B to sinusoidal analog signals inputted from the DA converter 15A through the non-inverting amplifier 16 and the inverting amplifier 17, and applies the sinusoidal analog signals to which the offset voltages is added to the capacitors C1, C2 of the acceleration sensor 11.

The acceleration sensor circuit 10 operates as described below. First, when a power source of the acceleration sensor circuit 10 is turned on, the MCU 14 is activated to start execution of a predetermined computer program and also, the AD converter 13 or the DA converters 15A, 15B are activated to start conversion processing of a signal.

Here, the MCU 14 generates sinusoidal digital data so as to output a sinusoidal wave (Sin wave) of a predetermined bias frequency from an analog output of the DA converter 15A, and sends the generated digital waveform data to the DA converter 15A. This bias frequency is set at a value much higher than a frequency of vibration (detection wave) detected by the acceleration sensor 11. A sinusoidal analog signal outputted from the DA converter 15A is branched on the way, and one branched signal is inputted to the adding amplifier 19A of the adding amplifier block 18 through the non-inverting amplifier 16 and the other branched signal is inputted to the adding amplifier 19B of the adding amplifier block 18 through the inverting amplifier 17.

In the adding amplifier block 18, the offset voltages from the DA converter 15B are applied to the sinusoidal analog signals outputted from the non-inverting amplifier 16 and the inverting amplifier 17. Accordingly, a sinusoidal wave with the same phase as that of the analog signal outputted by the DA converter 15A and amplitude shifted by the amount of the offset voltage is outputted from the adding amplifier 19A and also, a sinusoidal wave with a phase opposite to that of the analog signal outputted by the DA converter 15A and amplitude shifted by the amount of the offset voltage is outputted from the adding amplifier 19B. The sinusoidal analog signal outputted from the adding amplifier 19A is applied to the fixed electrode Pf1 of the side of the capacitor C1 of the two fixed electrodes Pf1, Pf2 present in the acceleration sensor 11. Also, the sinusoidal analog signal outputted from the adding amplifier 19B is applied to the fixed electrode Pf2 of the side of the capacitor C2 of the two fixed electrodes Pf1, Pf2 present in the acceleration sensor 11.

Since the sinusoidal waves outputted from the adding amplifier 19A and the adding amplifier 19B have a phase difference of 180° herein, electric charge amounts proportional to a difference (C1–C2) between capacitances and proportional to amplitude of the sinusoidal wave are accumulated in the movable electrodes Pm1, Pm2 of the acceleration sensor 11. Since the difference (C1–C2) between capacitances is proportional to acceleration of the acceleration sensor 11, acceleration caused to the acceleration sensor 11 can be detected by measuring a change in the difference (C1–C2) between capacitances. Thus, a technique for detecting acceleration from a time change in the difference (C1–C2) between capacitances indicates the time change in the difference (C1–C2) more remarkably than a technique for detecting acceleration based on a time change in a value of capacitance, so that detection sensitivity of acceleration increases. As a result, a dynamic range of the acceleration sensor 11 can be expanded.

In the head amplifier block 12, the difference (C1–C2) between capacitances of the capacitors C1, C2 of the acceleration sensor 11 is fetched as an electrical signal to output an analog signal whose voltage is proportional to acceleration. After an analog signal outputted from the head amplifier block 12 is encoded in the AD converter 13, the analog signal is inputted to the MCU 14. In the MCU 14, a signal, from the head amplifier block 12, converted into a digital signal is filtered by a band-pass filter implemented by software, and a frequency component other than a predetermined bias frequency of a sinusoidal wave outputted by the DA converter 15A is eliminated. Then, the digital signal filtered by the MCU 14 is outputted to the outside as an acceleration signal. As a result of increasing detection sensitivity by the acceleration sensor 11, the detected acceleration may include noise (for example, 1/f noise) due to various influences, but the frequency component other than the predetermined bias frequency is eliminated by the MCU 14, so that the noise can be eliminated. That is, the influence of the noise by increasing the detection sensitivity can be reduced. In addition, the acceleration signal may be outputted to the outside in a state of the digital signal, or may be outputted to the outside after the digital signal is converted into an analog signal by a DA converter.

As described above, a very low-cost circuit configuration can be obtained while increasing the detection sensitivity of acceleration when a circuit for handling a signal of the acceleration sensor is configured as the acceleration sensor circuit 10 according to the embodiment described above.

For example, if a rectangular wave is used as a waveform of a signal applied to the acceleration sensor, the rectangular wave includes odd-order harmonic components (components of an odd multiple of a fundamental wave) in addition to a fundamental frequency. Hence, in an analog circuit, harmonic waves often occur as a result of waveform distortion associated with non-linearity of the circuit, so that it is necessary to form a filter circuit capable of sufficiently attenuate such harmonic components, and a circuit configuration becomes complicated. However, since the acceleration sensor circuit 10 according to the embodiment described above uses a sinusoidal wave as the waveform of the signal applied to the acceleration sensor, when the sinusoidal wave without distortion is used, its spectrum becomes only a fundamental frequency, with the result that the circuit configuration can be simplified.

Also, according to the acceleration sensor circuit 10 according to the embodiment described above, even when the detected acceleration includes noise as a result of increasing detection sensitivity by the acceleration sensor 11, the fundamental frequency component has only to be handled, with the result that the influence of its noise can be reduced. Further, in the case of configuring the acceleration sensor circuit 10, a commercial digital audio IC (Integrated Circuit) can be used in an operational amplifier etc. and the acceleration sensor circuit can be configured in a versatile manner. Moreover, rather than processing all the signals of the acceleration sensor in an analog manner, the analog is temporarily replaced with digital and components other than a bias frequency are filtered and eliminated by a steep digital band-pass filter and thereby, 1/f noise etc. peculiar to the case of using the operational amplifier can be eliminated easily.

EXAMPLE

Figure 3:
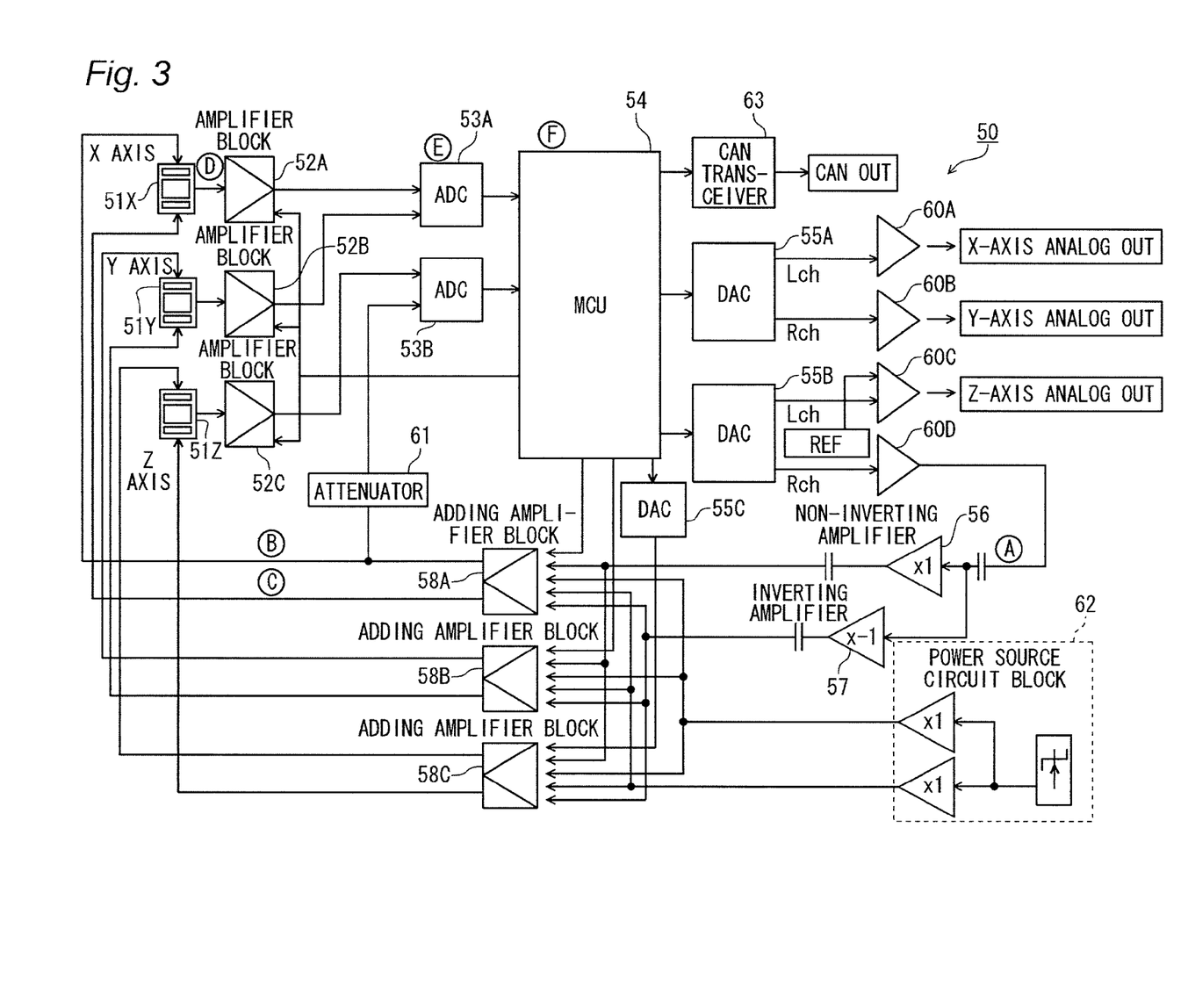
FIG. 3 is a diagram showing an acceleration sensor circuit according to an example.

One example of the case of implementing the acceleration sensor circuit 10 according to the embodiment described above will hereinafter be shown using a commercial digital audio IC etc. FIG. 3 shows an acceleration sensor circuit according to the present example. In addition, in the following, the same names are assigned to the same configurations as the configurations according to the embodiment described above and its detailed explanation is omitted. Also, the present example takes the case of detecting three-axis acceleration by three acceleration sensors as an example. However, the present example may be constructed so as to detect one-axis or two-axis acceleration.

An acceleration sensor circuit 50 according to the present example includes an acceleration sensor 51X for detecting acceleration in an X-axis direction, an acceleration sensor 51Y for detecting acceleration in a Y-axis direction, an acceleration sensor 51Z for detecting acceleration in a Z-axis direction, head amplifier blocks 52A, 52B, 52C, AD converters 53A, 53B, an MCU 54, DA converters 55A, 55B, 55C, LPFs (Low-pass filter) 60A, 60B, 60C, 60D, a non-inverting amplifier 56, an inverting amplifier 57, adding amplifier blocks 58A, 58B, 58C, an attenuator 61, and a power source circuit block 62.

The AD converters 53A, 53B and the DA converters 55A, 55B, 55C also use commercial AD converter and DA converter for digital audio equipment, and have high cost performance, and respectively have two channels (Lch and Rch) for generating left and right independent sound signals. Sampling frequencies of the AD converters 53A, 53B and the DA converters 55A, 55B are set at a frequency (for example, 96 kHz) capable of properly processing a sinusoidal signal of a bias frequency (9.6 kHz) used in the present example.

The LPFs 60A, 60B, 60C, 60D are low-pass filters constructed of integration circuits including an operational amplifier, a resistor or a capacitor, and are filters for passing through a low-frequency signal and breaking (attenuating) a signal of a frequency higher than a predetermined frequency. The LPFs 60A, 60B, 60C, 60D eliminate harmonic components peculiar to output signals of the DA converters 55A, 55B.

A CAN (Controller Area Network) transceiver 63 is an input-output interface for communicating with peripheral equipment through a communication line of communication standards CAN used in in-car communication etc. Since the CAN can connect plural sensor circuits in series by one signal line, the CAN is convenient for data collection in the case of making various measurements.

Functions of the non-inverting amplifier 56 and the inverting amplifier 57 are basically similar to those of the non-inverting amplifier 16 and the inverting amplifier 17 according to the embodiment described above. Further, the non-inverting amplifier 56 and the inverting amplifier 57 also have a function as a high-pass filter constructed of a differentiation circuit including an operational amplifier, a resistor or a capacitor.

Figure 4:
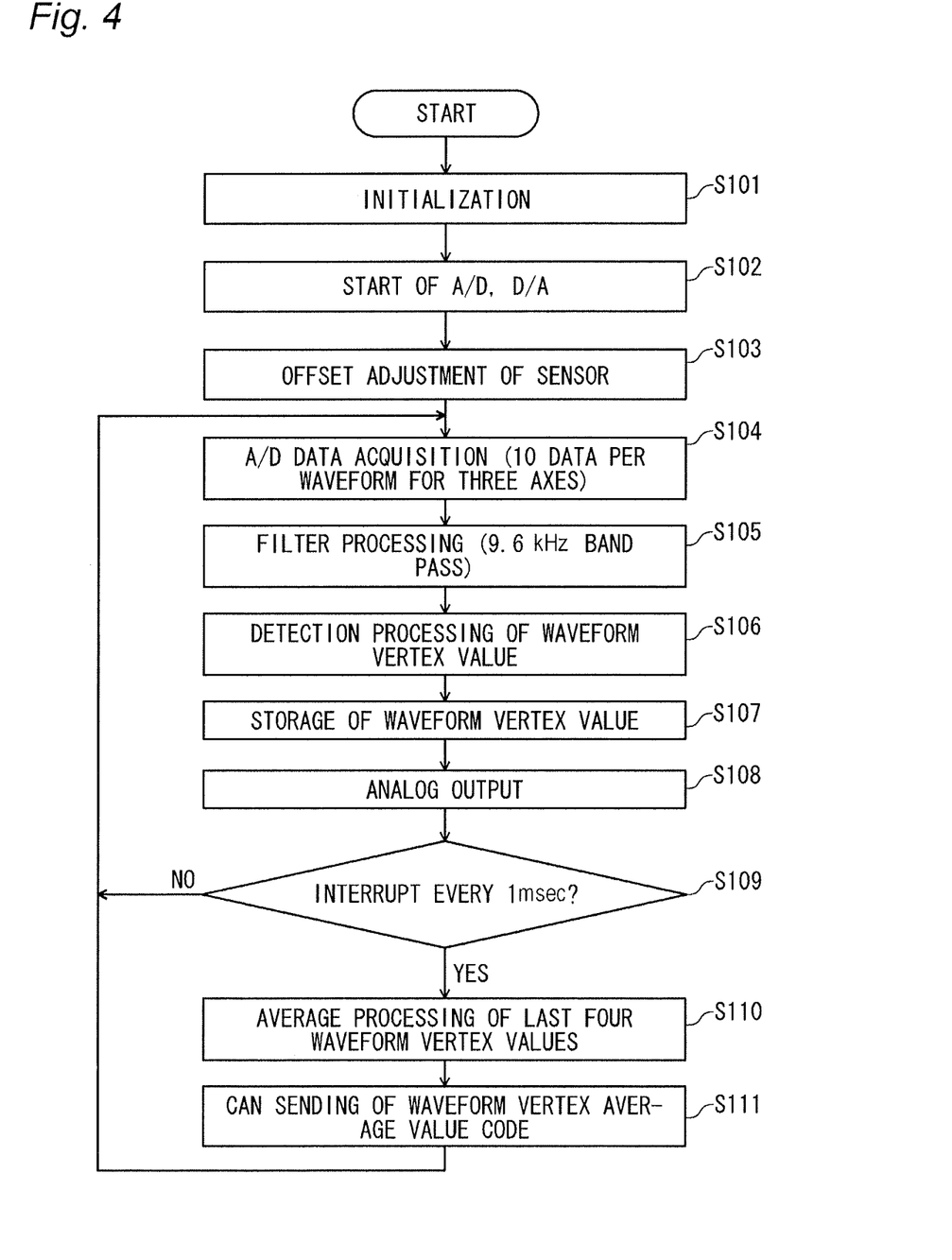
FIG. 4 is a flow diagram of processing executed in the acceleration sensor circuit.

Next, operation of the acceleration sensor circuit 50 described above will be described. When a power source of the acceleration sensor circuit 50 is turned on, the acceleration sensor circuit 50 operates as described below. FIG. 4 shows a flow of processing executed in the acceleration sensor circuit 50.

(Step S101) When a power source of the acceleration sensor circuit 50 is turned on, the MCU 54 performs initialization. That is, the MCU 54 clears internal memory or internally implements a digital band-pass filter etc. by executing a predetermined computer program.

Figure 5:
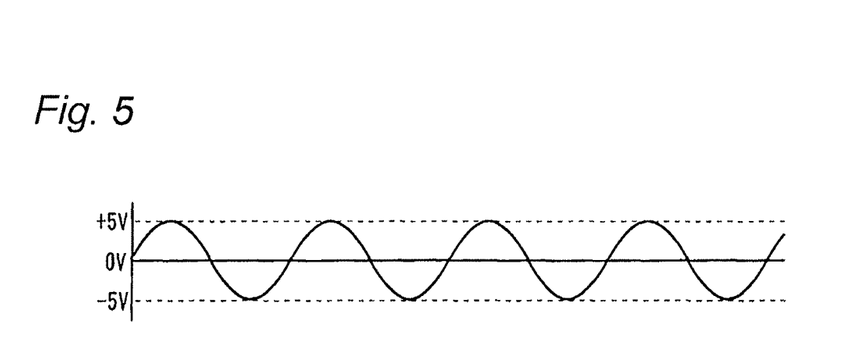
FIG. 5 is a diagram showing one example of a waveform of a sinusoidal wave generated by a DA converter.

(Step S102) Next, the MCU 54 actuates the AD converters 53A, 53B and the DA converters 55A, 55B, 55C and starts processing of AD conversion and DA conversion. Here, the MCU 54 generates sinusoidal digital data and sends the data to the DA converter 55B as digital data for Rch so as to output a sinusoidal wave of 9.6 kHz from an analog output (Rch) of the DA converter 55B. Accordingly, in the DA converter 55B, a sinusoidal analog signal as shown in FIG. 5 is generated and is outputted from Rch, and the sinusoidal analog signal is inputted to the non-inverting amplifier 56 and the inverting amplifier 57. In addition, a waveform detected in (A) on a signal line in FIG. 3 is shown in FIG. 5. Accordingly, a sinusoidal wave ($V_{p-p}$5V) of 9.6 kHz is outputted from the non-inverting amplifier 56 and also, a sinusoidal wave ($V_{p-p}$5V) with the same frequency as that of the sinusoidal wave outputted by the non-inverting amplifier 56 and a phase opposite to that of the sinusoidal wave is outputted from the inverting amplifier 57. Accordingly, a sinusoidal wave ($V_{p-p}$10V) of 9.6 kHz is outputted from the adding amplifier blocks 58A, 58B, 58C.

(Step S103) Then, the MCU 54 makes an offset adjustment of the acceleration sensors 51X, 51Y, 51Z. For example, consider the case of applying an offset voltage of 2.5 V to the adding amplifier block 58A.

Figure 6:
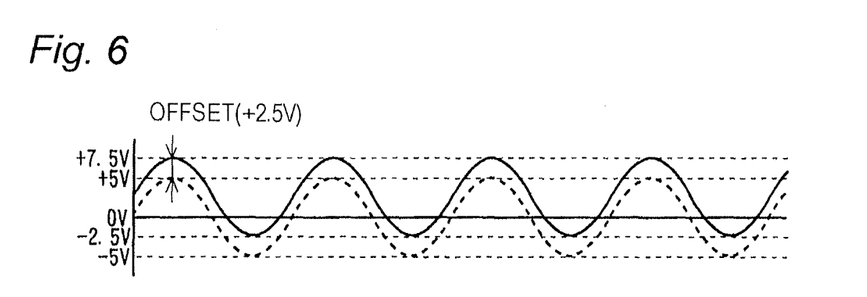
FIG. 6 is a diagram showing one example of a signal applied to the side of a capacitor C1 of an acceleration sensor.
Figure 7:
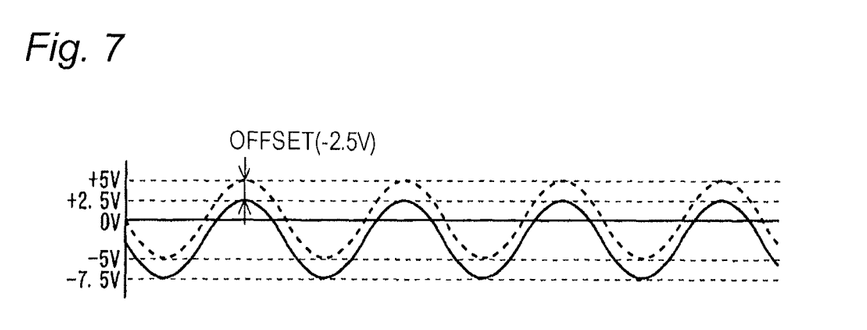
FIG. 7 is a diagram showing one example of a signal applied to the side of a capacitor C2 of the acceleration sensor.

The adding amplifier blocks 58A, 58B, 58C have a circuit configuration so that an offset voltage from the MCU 54 or the DA converter 55C is applied to a sinusoidal analog signal outputted from the non-inverting amplifier 56 and the inverting amplifier 57. Hence, for example, in the case of applying an offset voltage of +2.5 V to the adding amplifier block 58A, for example, a sinusoidal wave with the same phase as that of an analog signal outputted by the DA converter 55B and amplitude shifted by the amount of the offset voltage as shown in FIG. 6 is sent to the side of a capacitor C1 of the acceleration sensor 51X. Also, for example, a sinusoidal wave with a phase opposite to that of an analog signal outputted by the DA converter 55B and amplitude shifted by the amount of the offset voltage as shown in FIG. 7 is sent to the side of a capacitor C2 of the acceleration sensor 51X. A waveform detected in (B) on the signal line in FIG. 3 is shown in FIG. 6, and a waveform detected in (C) on the signal line in FIG. 3 is shown in FIG. 7.

Since the sinusoidal wave inputted to the side of the capacitor C1 and the sinusoidal wave inputted to the side of the capacitor C2 of the acceleration sensor 51X have a phase difference of 180° herein, an output voltage $V_3$ of the head amplifier block 52A is expressed by the following formula, for example, when a feedback capacitance of the head amplifier block 52A is set at CR and a reference potential is set at Vin.

$$V_3 = Vin \frac{C_1 - C_2}{CR} \qquad \text{[Formula 1]}$$

Figure 8:
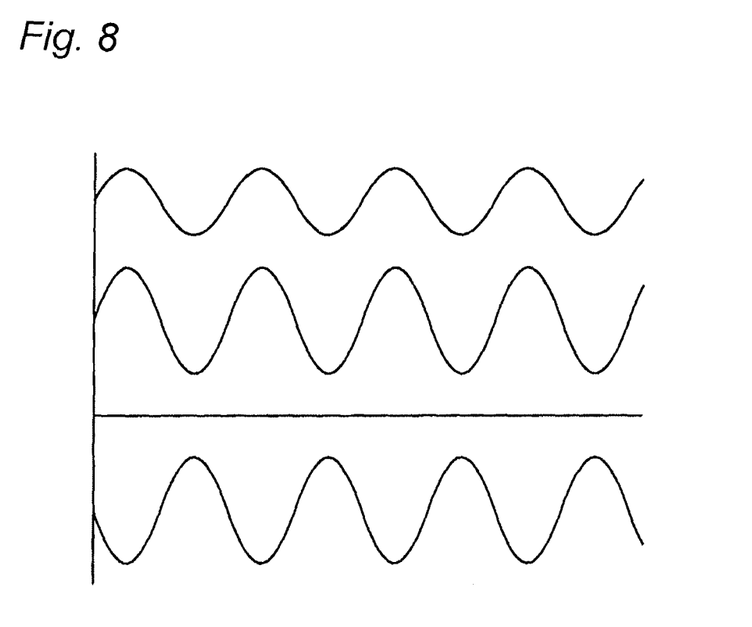
FIG. 8 is a diagram showing one example of a signal outputted by a head amplifier block.

From the above formula (Formula 1), the output voltage $V_3$ of the head amplifier block 52A depicts, for example, waveforms as shown by a graph of FIG. 8. That is, for example, when a capacitance C1 of the capacitor C1 is larger than a capacitance C2 of the capacitor C2 (C1>C2), the output voltage $V_3$ of the head amplifier block 52A has the same phase as that of an output voltage of the DA converter 55B as shown by the waveform of the second step from the top in FIG. 8. Also, when the capacitance C1 of the capacitor C1 is equal to than the capacitance C2 of the capacitor C2 (C1=C2), the output voltage $V_3$ of the head amplifier block 52A becomes constant as shown by the waveform of the third step from the top in FIG. 8. Also, when the capacitance C1 of the capacitor C1 is smaller than the capacitance C2 of the capacitor C2 (C1<C2), the output voltage $V_3$ of the head amplifier block 52A has a phase opposite to that of the output voltage of the DA converter 55B as shown by the waveform of the fourth step from the top in FIG. 8. In addition, in the graph of FIG. 8, a waveform (waveform detected in (A) on the signal line in FIG. 3) of a signal sent from the DA converter 55B to the non-inverting amplifier 56 and the inverting amplifier 57 is together described in the first step from the top in FIG. 8 in order to check the phase. Such a check of the phase can be made, for example, by using a signal sent from the attenuator 61 to the MCU 54 through the AD converter 53B. In addition, waveforms detected in (D) on the signal line in FIG. 3 are shown in the second to fourth steps from the top in FIG. 8.

Thus, the MCU 54 adjusts the offset voltages applied to the adding amplifier blocks 58A, 58B, 58C so that the output voltages of the head amplifier blocks 52A, 52B, 52C become constant in a state in which acceleration is not caused to the acceleration sensors 51X, 51Y, 51Z.

Figure 9:
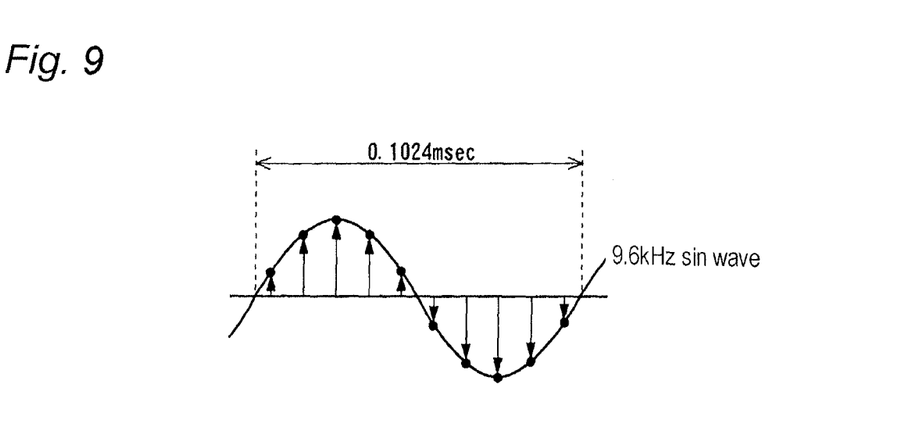
FIG. 9 is a diagram showing one example of sampling processing of a waveform of an analog signal.

(Step S104) After a series of processing (S101 to S103) is ended and processing in the case of activating the acceleration sensor circuit 50 is completed, the acceleration sensor circuit 50 executes the following processing and measures data of acceleration. That is, analog signals outputted from the head amplifier blocks 52A, 52B, 52C are inputted to the AD converters 53A, 53B. Then, in the AD converters 53A, 53B, for example, as shown in FIG. 9, a waveform of the analog signal is sampled and the analog signal is converted into a digital signal. In addition, a waveform detected in (E) in FIG. 3 is shown in FIG. 9.

Figure 10:
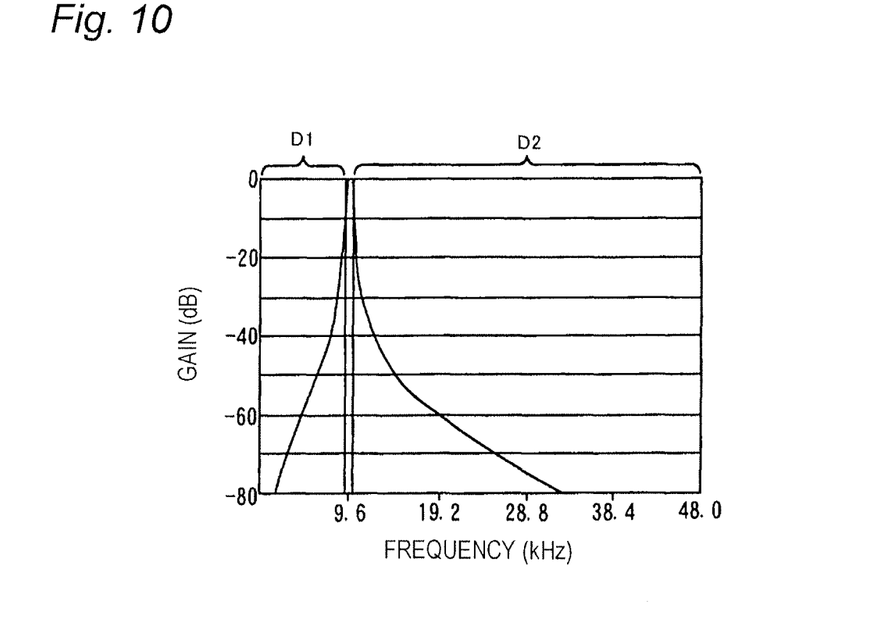
FIG. 10 is a diagram showing one example of a spectrum of a signal processed by a BPF.

(Step S105) In the MCU 54, as shown in FIG. 10, a signal from the head amplifier block 52A converted into the digital signal is filtered by a steep digital band-pass filter based on Fourier transformation, and signals of frequency components other than a bias frequency (9.6 kHz±250 Hz) are eliminated. Also, the following processing can obtain a similar effect. That is, signals of frequency components between 0 and 9.6 kHz−250 Hz (a region shown by D1 in FIG. 10) are eliminated by a high-pass filter, and signals of frequency components in excess of 9.6 kHz+250 Hz (a region shown by D2 in FIG. 10) are eliminated by a low-pass filter.

Figure 11:
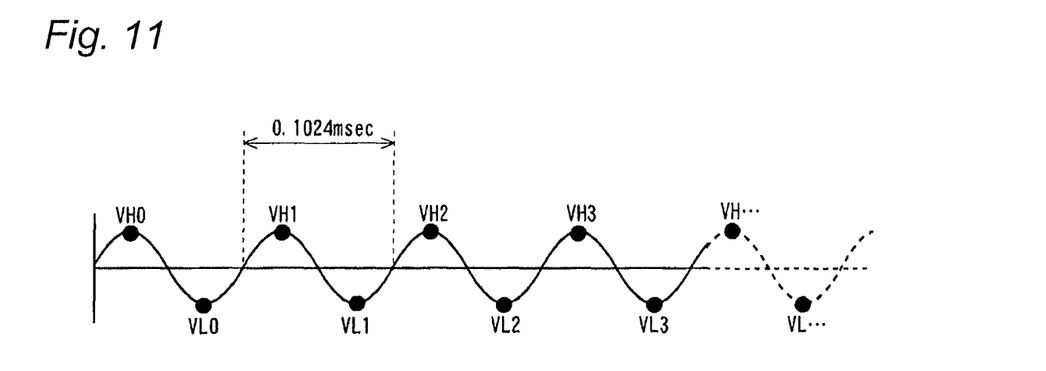
FIG. 11 is a diagram showing one example of vertex detection processing.

(Step S106) The MCU 54 analyzes a waveform of a signal filtered by the band-pass filter, and detects values of vertices (VH, VL) of the waveform as shown in FIG. 11. Since this waveform is a sinusoidal wave with the same frequency as the bias frequency, detection processing of the values of vertices (VH, VL) is performed every 0.1042 ms. In addition, a waveform detected in (F) in FIG. 3 is shown in FIG. 11.

(Step S107) When the MCU 54 detects the values of vertices (VH, VL), the detected values are sequentially stored in memory of the inside of the MCU 54.

(Step S108) Also, the MCU 54 substitutes the detected values of vertices (VH, VL) into the following formula (Formula 2), and calculates a digital value of a voltage proportional to acceleration. Then, data of a digital value $D_{OUT}$ obtained by multiplying the calculated digital value by a predetermined coefficient according to characteristics of the DA converters 55A, 55B is sent to the DA converters 55A, 55B. Accordingly, an analog signal of the acceleration is outputted from the DA converters 55A, 55B. In addition, the analog signal of the acceleration may be constructed so that an X-axis single-end signal is outputted from the LPF 60A and a Y-axis single-end signal is outputted from the LPF 60B and a Z-axis single-end signal is outputted from the LPF 60C as shown in FIG. 3 but, for example, only the single-end signal about any axis may be outputted, or a differential signal about any axis may be outputted using two LPFs. A concrete form of the outputted signal can properly be changed by a program executed by the MCU 54.

$$V_{out} = \frac{(VH_n - VL_n)}{2}$$ [Formula 2]

(Step S109) The MCU 54 executes a series of steps (S104 to S108) described above every 0.1042 ms. Also, the MCU 54 executes the following processing every a lapse of 1 ms according to an update rate of CAN, and sends out digital data of acceleration to the communication line of CAN through the CAN transceiver 63.

(Step S110) That is, the MCU 54 substitutes data of the last four values of vertices (VH, VL) stored in memory into the following formula (Formula 3) and performs average processing, and generates acceleration data for CAN.

$$V_{outCAN} = \frac{1}{4} \sum_{n=N}^{N+3} (VHn - VLn)$$ [Formula 3]

(Step S111) Then, the MCU 54 sends out the calculated acceleration data for CAN, and sends out digital data of acceleration to the communication line of CAN through the CAN transceiver 63.

By repeatedly executing a series of processing (S101 to S111) by the acceleration sensor circuit 50 as described above, good acceleration data with high sensitivity can be obtained by a low-cost circuit configuration. That is, according to the acceleration sensor circuit 50 described above, a commercial audio IC etc. can be used to implement the low-cost circuit configuration and also, a wide range of output voltages with respect to a voltage inputted to the acceleration sensor can be obtained to implement highly-sensitive signal processing. Hence, the circuit configuration is a very efficient circuit configuration.

In addition, the frequencies, the voltage values, etc. shown in the example described above are only illustrative, and the invention is not limited to the aspect described above. That is, the acceleration sensor circuit according to the invention may properly change frequencies, voltages, etc. in the range capable of detecting desired vibration etc.

Here, features of the embodiment of the acceleration sensor circuit according to the invention described above are briefly summarized and listed in the following [1] to [4], respectively.

[1] An acceleration sensor circuit (10) including:
an acceleration sensor (11) having a first capacitor (C1) whose capacitance changes according to a position of a first movable electrode (Pm1), and a second capacitor (C2) whose capacitance changes as opposed to the first capacitor (C1) according to a position of a second movable electrode (Pm2) moved together with the first movable electrode (Pm1);
an adding amplifier block (18) for generating a sinusoidal AC signal of a predetermined frequency for being applied to the first capacitor (C1) and the second capacitor (C2) in mutually opposite phases;
a head amplifier block (12) for generating a signal according to the positions of the first movable electrode (Pm1) and the second movable electrode (Pm2) based on a difference between a capacitance of the first capacitor (C1) and a capacitance of the second capacitor (C2) and the sinusoidal AC signal applied to the first capacitor (C1) and the second capacitor (C2); and
an MCU (14) for analyzing data in which a signal generated by the head amplifier block (12) is encoded, extracting a signal of a frequency component of substantially the same frequency as the predetermined frequency from the data and outputting data of acceleration based on the extracted signal.

[2] The acceleration sensor circuit (10) according to [1], wherein the adding amplifier block (18) includes DA converters (15A, 15B) for generating the sinusoidal AC signal of an analog based on a digital signal obtained by converting a sinusoidal wave of the predetermined frequency generated by the MCU (14).

[3] The acceleration sensor circuit (10) according to [2], wherein the adding amplifier block (18) includes a non-inverting amplifier (16) for applying a sinusoidal AC signal with the same phase as that of a signal generated by the DA converters (15A, 15B) to the first capacitor (C1), and an inverting amplifier (17) for applying a sinusoidal AC signal with a phase opposite to that of a signal generated by the DA converters to the second capacitor (C2).

[4] The acceleration sensor circuit (10) according to [3], wherein the MCU (14) adds a predetermined voltage, to the sinusoidal AC signal outputted from the non-inverting amplifier (16) and applied to the first capacitor (C1), and to the sinusoidal AC signal outputted from the inverting amplifier (17) and applied to the second capacitor (C2), and makes an offset adjustment.

The invention has been described in detail with reference to the specific embodiment, but it is apparent to those skilled in the art that various changes or modifications can be made without departing from the spirit and scope of the invention.

The present application is based on Japanese patent application (patent application No. 2011-216051) filed on Sep. 30, 2011, and the contents of the patent application are hereby incorporated by reference.

INDUSTRIAL APPLICABILITY

The invention is useful in the field of an acceleration sensor circuit for detecting acceleration by a change in capacitance.

REFERENCE SIGNS LIST 10,50 ACCELERATION SENSOR CIRCUIT
11,51X,51Y,51Z ACCELERATION SENSOR
12,52A,52B,52C HEAD AMPLIFIER BLOCK
13,53A,53B AD CONVERTER
14,54 MCU
15A,15B,55A,55B,55C DA CONVERTER
16,56 NON-INVERTING AMPLIFIER
17,57 INVERTING AMPLIFIER
18,58A,58B,58C ADDING AMPLIFIER BLOCK
19A,19B ADDING AMPLIFIER
60A,60B,60C,60D LPF
61 ATTENUATOR
62 POWER SOURCE CIRCUIT BLOCK
63 CAN TRANSCEIVER

The invention claimed is:

1. An acceleration sensor circuit comprising:
an acceleration sensor including a first capacitor whose capacitance changes according to a position of a first movable electrode, and a second capacitor whose capacitance changes as opposed to the first capacitor according to a position of a second movable electrode moved together with the first movable electrode;
a first circuit for generating a sinusoidal AC signal of a predetermined frequency for being applied to the first capacitor and the second capacitor in mutually opposite phases;
a second circuit for generating a signal according to the positions of the first movable electrode and the second movable electrode based on a difference between a capacitance of the first capacitor and a capacitance of the second capacitor and the sinusoidal AC signal applied to the first capacitor and the second capacitor; and
an arithmetic circuit for analyzing data in which a signal generated by the second circuit is encoded, extracting a signal of a frequency component of substantially the same frequency as the predetermined frequency from the data, and outputting data of acceleration based on the extracted signal,
wherein the first circuit includes a DA converter for generating the sinusoidal AC signal of an analog based on a digital signal obtained by converting a sinusoidal wave of the predetermined frequency generated by the arithmetic circuit,
wherein the first circuit includes a non-inverting amplifier for applying a sinusoidal AC signal with the same phase as that of a signal generated by the DA converter to the first capacitor, and an inverting amplifier for applying a sinusoidal AC signal with a phase opposite to that of a signal generated by the DA converter to the second capacitor,
wherein the arithmetic circuit outputs a predetermined voltage, to the sinusoidal AC signal outputted from the non-inverting amplifier and applied to the first capacitor, and to the sinusoidal AC signal outputted from the inverting amplifier and applied to the second capacitor, and upon initialization of the acceleration sensor circuit makes an offset adjustment to zero when acceleration is zero,
wherein the offset adjustment is applied to each of the sinusoidal AC signals outputted from the non-inverting amplifier and the inverting amplifier, respectively, to shift an amplitude of the signal generated by the DA converter, and
wherein the arithmetic circuit outputs, as the data of acceleration, a value obtained by dividing a difference between a high-voltage side vertex and a low-voltage side vertex of the extracted signal of the frequency component by two.

2. The acceleration sensor circuit according to claim 1, wherein
the first circuit includes a first adding amplifier having a first input that inputs the sinusoidal AC signal outputted from the non-inverting amplifier and an output that applies the sinusoidal AC signal with the same phase as that of the signal generated by the DA converter to the first capacitor, and the first circuit includes a second adding amplifier having a first input that inputs the sinusoidal AC signal outputted from the inverting amplifier and an output that applies the sinusoidal AC signal with the phase opposite to that of the signal generated by the DA converter to the second capacitor, and
the arithmetic circuit outputs the predetermined voltage to a second input of the first adding amplifier, thereby adding the predetermined voltage to the sinusoidal AC signal outputted from the non-inverting amplifier and applied to the first capacitor by the first adding amplifier, the arithmetic circuit outputs the predetermined voltage to a second input of the second adding amplifier, thereby adding the predetermined voltage to the sinusoidal AC signal outputted from the inverting amplifier and applied to the second capacitor by the second adding amplifier.

3. An acceleration sensor circuit comprising:
an acceleration sensor including a first capacitor whose capacitance changes according to a position of a first movable electrode, and a second capacitor whose capacitance changes as opposed to the first capacitor according to a position of a second movable electrode moved together with the first movable electrode;

a first circuit for generating a sinusoidal AC signal of a predetermined frequency for being applied to the first capacitor and the second capacitor in mutually opposite phases;

a second circuit for generating a signal according to the positions of the first movable electrode and the second movable electrode based on a difference between a capacitance of the first capacitor and a capacitance of the second capacitor and the sinusoidal AC signal applied to the first capacitor and the second capacitor; and an arithmetic circuit for analyzing data in which a signal generated by the second circuit is encoded, extracting a signal of a frequency component of substantially the same frequency as the predetermined frequency from the data, and outputting data of acceleration based on the extracted signal, wherein the first circuit includes a DA converter for generating the sinusoidal AC signal of an analog based on a digital signal obtained by converting a sinusoidal wave of the predetermined frequency generated by the arithmetic circuit, wherein the first circuit includes a non-inverting amplifier for applying a sinusoidal AC signal with the same phase as that of a signal generated by the DA converter to the first capacitor, and an inverting amplifier for applying a sinusoidal AC signal with a phase opposite to that of a signal generated by the DA converter to the second capacitor, wherein the arithmetic circuit outputs a predetermined voltage, to the sinusoidal AC signal outputted from the non-inverting amplifier and applied to the first capacitor, and to the sinusoidal AC signal outputted from the inverting amplifier and applied to the second capacitor, wherein the first circuit includes a first adding amplifier having a first input that inputs the sinusoidal AC signal outputted from the non-inverting amplifier and an output that applies the sinusoidal AC signal with the same phase as that of the signal generated by the DA converter to the first capacitor, and the first circuit includes a second adding amplifier having a first input that inputs the sinusoidal AC signal outputted from the inverting amplifier and an output that applies the sinusoidal AC signal with the phase opposite to that of the signal generated by the DA converter to the second capacitor, and wherein the arithmetic circuit outputs the predetermined voltage to a second input of the first adding amplifier, thereby adding the predetermined voltage to the sinusoidal AC signal outputted from the non-inverting amplifier and applied to the first capacitor by the first adding amplifier, the arithmetic circuit outputs the predetermined voltage to a second input of the second adding amplifier, thereby adding the predetermined voltage to the sinusoidal AC signal outputted from the inverting amplifier and applied to the second capacitor by the second adding amplifier.

* * * * *